June 22, 1926.

A. PORTER

STEERING GEAR CHECK

Filed May 23, 1925

1,589,554

Inventor
Alma Porter,
By Harry F. Riley
Attorney

Patented June 22, 1926.

1,589,554

UNITED STATES PATENT OFFICE.

ALMA PORTER, OF LAVA HOT SPRINGS, IDAHO.

STEERING-GEAR CHECK.

Application filed May 23, 1925. Serial No. 32,336.

The invention relates to a steering gear check for automobiles.

The object of the present invention is to provide a simple, practical and efficient noiseless steering device of strong, durable and comparatively inexpensive construction designed principally for use on Ford machines and automobiles of a similar character and adapted to be readily applied to the front axle of an automobile and capable of maintaining a constant yieldable engagement with the steering rod and upholding the same in any position and effectually preventing the said steering rod from vibrating or rattling.

A further object of the invention is to provide a device of this character equipped with a resilient clamp and with means carried by the steering rod for positive engagement with the clamp for holding the steering rod against movement until the steering rod is positively actuated by the steering wheel whereby the steering of a Ford machine is rendered safe and easy.

A further object of the invention is to provide a noiseless steady steerer capable of ready adjustment for maintaining the desired yieldable frictional engagement with the steering rod and with the said means to adapt the device to the character of roads either smooth or rough as the case may be.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Figure 1:
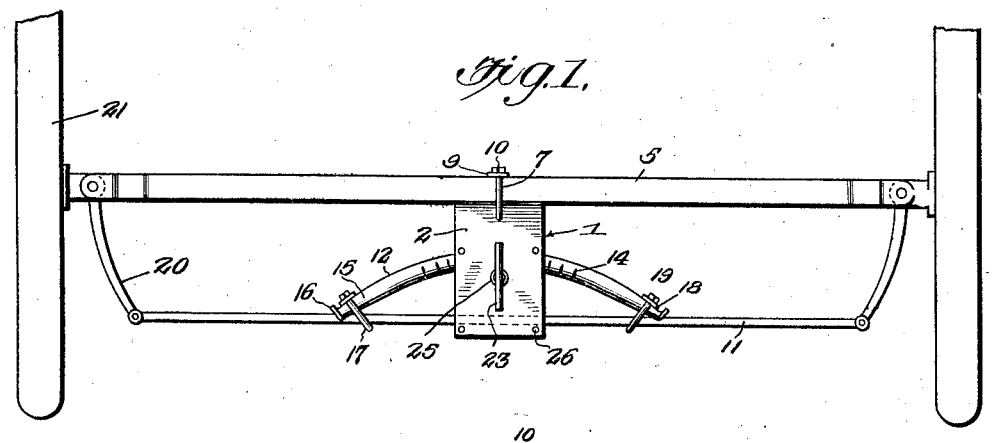
Figure 1 is a plan view of a noiseless steady steerer device constructed in accordance with this invention and shown applied to the front axle and steering rod of an automobile.
Figure 2:
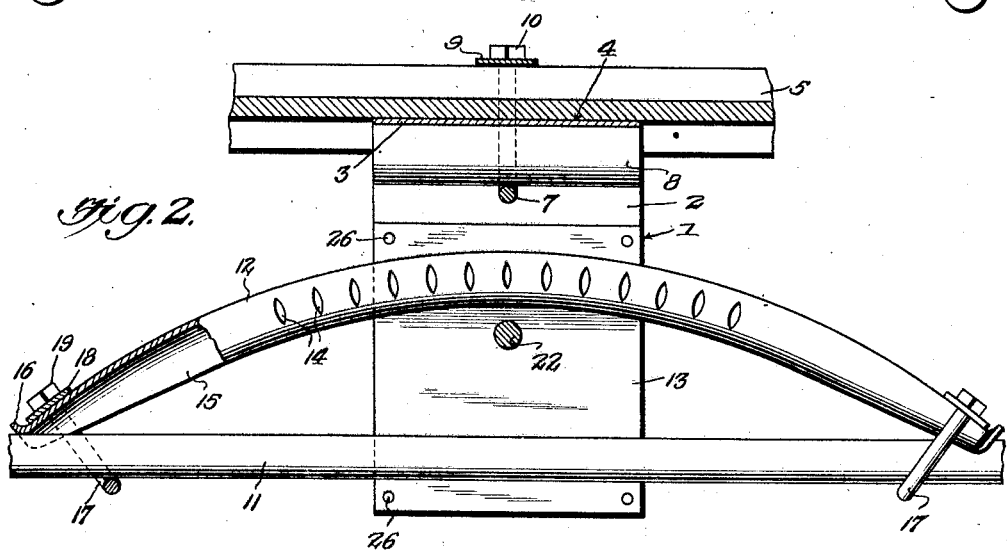
Fig. 2 is an enlarged horizontal sectional view of the device.
Figure 3:
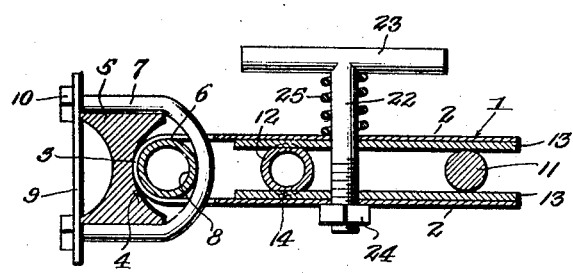
Fig. 3 is a vertical longitudinal sectional view of the same.

In the accompanying drawing in which is illustrated the preferred embodiment of the invention the noiseless steady steerer device comprises in its construction a resilient clamp 1 composed of upper and lower jaws 2 and a connecting bend 3 which is fitted in the channel 4 of the front axle 5 of a Ford automobile or similar machine. The resilient clamp which is constructed of spring metal or other suitable material is provided at the front with a slot 6 through which passes a central axle clip 7 and which engages a tubular cylindrical member 8 arranged in the bend of the clamp and engaging and supporting the same as clearly illustrated in Fig. 3 of the drawing. The axle clip 7 is provided with a clip plate 9 and nuts 10 of the ordinary construction and it conforms to the configuration of the cylindrical clamp supporting and engaging member which is preferably of a length approximately equal the width of the clamp as clearly shown in Fig. 2 of the drawing.

The jaws of the clamp extend rearwardly beyond the steering rod 11 of the automobile and the rear portions of the jaws clamp the same while the intermediate portions of the jaws engage and clamp a curved corrugated frictional clamp engaging bar 12. The inner faces of the jaws are provided with flexible elastic lining pieces 13 of rubber and fabric or other suitable material constituting sound deadening pads and also elastic yieldable frictional faces for engaging the corrugations 14 at the upper and lower faces of the curved bar 12 of the steering rod. The corrugations are formed by transverse grooves and the curved bar is preferably tubular and its ends 15 are cut away longitudinally to form semi-tubular portions to fit the steering rod and the extreme ends of the semi-tubular portions are bent upwardly at an angle to provide retaining lugs 16 for preventing clips 17 from slipping off the ends of the curved clamp engaging bar 12. The clips are U-shaped and embrace the steering rod and conform to the configuration of the same and are provided with clip plates 18 and nuts 19 of the usual construction. By the particular construction of the ends of the curved clamp engaging bar the latter is securely mounted on the steering rod. The steering rod is of the usual construction and is connected with the arms 20 of the spindles of the front wheels 21 in the usual manner and also with the steering wheel of the automobile and when the steering wheel is turned to the right or to the left the steering rod and curved bar are caused to slide between the upper and lower jaws of the clamp.

The upper and lower jaws are connected by an adjusting screw 22 provided at its upper end with a handle 23 and at its lower end with a nut 24 and it is equipped with a coiled spring 25 preferably interposed between the upper jaw and the handle for supplementing the action of the spring metal of the clamp. By adjusting the screw 22 the spring tension of the clamp and the engagement of the same with the steering rod and the curved bar are controlled and the flexible elastic lining pieces of the inner faces of the jaws are adapted to sink into the corrugations of the curved bar and positively grip the same to effectually prevent the bar and the steering rod from accidentally slipping longitudinally between the jaws of the clamp. The adjusting screw enables the device to be adjusted to suit smooth and rough roads and it will render the steering of a Ford or similar automobile safe and easy and prevent the wheels from accidentally turning and causing the machine to skid in sand and other places. The elastic lining pieces are secured by rivets 26 to the inner faces of the jaws and any other suitable means may be employed for this purpose and the lining pieces when worn may readily be renewed. The device is easily and quickly applied to a Ford automobile without necessitating any change or alteration in the construction thereof.

The spring may be arranged either at the top or bottom of the adjusting screw but it is preferable to locate the spring as shown.

By arranging the tensioning bolt between the steering rod and the curved corrugated bar the jaws of the clamp are caused to engage both of the said parts with the desired spring tension.

What is claimed is:

1. A steady steerer device for automobiles including a clamp having upper and lower jaws arranged above and below the steering rod of an automobile, a bowed bar mounted on the steering rod and arranged in substantially the same horizontal plane as the said steering rod and provided at its upper and lower faces with corrugations and passing through the clamp, and adjusting means for tensioning the clamp and for causing the same to engage both the steering rod and the bowed rod.

2. A steady steerer device for automobiles including a clamp having upper and lower jaws arranged above and below the steering rod of an automobile, a bowed bar mounted on the steering rod and arranged in substantially the same horizontal plane as the steering rod and provided at its upper and lower faces with corrugations and passing through the clamp, flexible frictional lining pieces secured to the inner faces of the jaws and arranged to engage the steering rod and the corrugated bar and tensioning means for connecting the jaws for forcing the lining pieces into the corrugations and for causing the same to simultaneously engage the steering rod.

3. A steady steerer device for automobiles including a clamp composed of upper and lower jaws, flexible lining pieces secured to the inner faces of the jaws and arranged to engage the steering rod of an automobile, a curved bar mounted on the steering rod and arranged in substantially the same horizontal plane as the steering rod and provided at its upper and lower faces with corrugations engaged by the lining pieces and means for tensioning the clamp for causing the same to engage both the steering rod and the curved bar.

4. A steady steerer device for automobiles including a clamp having upper and lower jaws, means for securing the clamp to an axle of an automobile in position for the jaws to engage the steering rod thereof, a curved tubular bar passing through the clamp and having semi-tubular terminal portions fitted against the steering rod and provided with projecting retaining lugs, clips securing the ends of the curved bar to the steering rod and retained in position by the said lugs.

In testimony whereof I affix my signature.

ALMA PORTER.